United States Patent
Sakakiyama

(10) Patent No.: US 6,564,139 B2
(45) Date of Patent: May 13, 2003

(54) APPARATUS AND METHOD FOR CONTROLLING A FOUR-WHEEL DRIVE VEHICLE

(75) Inventor: Ryuzo Sakakiyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/068,372

(22) Filed: Feb. 6, 2002

(65) Prior Publication Data

US 2002/0107628 A1 Aug. 8, 2002

(30) Foreign Application Priority Data

Feb. 8, 2001 (JP) ........................................ 2001-032695

(51) Int. Cl.$^7$ ............................................... B60K 23/08
(52) U.S. Cl. ........................ 701/89; 280/12.13; 180/197
(58) Field of Search .............................. 701/89, 90, 82, 701/36, 1; 280/12.13; 180/197

(56) References Cited

U.S. PATENT DOCUMENTS

| 4,716,982 A | * | 1/1988 | Ishii et al. ................... 180/415 |
|---|---|---|---|
| 4,941,095 A | * | 7/1990 | Imaseki et al. ............. 180/415 |
| 4,953,654 A | * | 9/1990 | Imaseki et al. ............. 180/197 |
| 5,005,131 A | * | 4/1991 | Imaseki et al. ............. 180/197 |
| 5,287,941 A | * | 2/1994 | Masuda et al. ............. 180/197 |
| 5,419,624 A | * | 5/1995 | Adler et al. ................. 180/197 |
| 5,701,247 A | * | 12/1997 | Sasaki ........................ 180/197 |
| 6,208,928 B1 | * | 3/2001 | Batistic ...................... 303/163 |
| 6,412,368 B1 | * | 7/2002 | Seki et al. .................. 74/65 C |

FOREIGN PATENT DOCUMENTS

| JP | 61-37541 | 2/1986 | ........... B60K/17/34 |
|---|---|---|---|
| JP | 1-266049 | 10/1989 | ............. B60T/8/58 |

* cited by examiner

Primary Examiner—William A Cuchlinski, Jr.
Assistant Examiner—Olga Hernandez
(74) Attorney, Agent, or Firm—Darby & Darby

(57) ABSTRACT

In case there occurs a wheel slip in either one of front left and right wheels or rear left and right wheels, a traction control through an engine output and a traction control through braking are implemented. Furthermore, in case the vehicle speed is slow, a final limited slip differential torque is set by adding a limited slip differential compensation amount according to a steering angle to a limited slip differential torque set according to an inputted torque and a front/rear differential rotation, and further adding thereto a limited slip differential compensation amount according to the vehicle speed for increasing the compensation.

16 Claims, 3 Drawing Sheets

APPARATUS AND METHOD FOR CONTROLLING A FOUR-WHEEL DRIVE VEHICLE

BACKGROUND OF THE INVENTION

1. Field of the Invention

The present invention relates to an apparatus and a method for controlling a four-wheel drive vehicle, which can implement optimum controls even when an on-board traction control device operates so that driving force transmitted to a road surface is limited.

2. Description of the Related Art

In recent years, a traction control device is equipped on automotive vehicles which controls engine outputs and braking forces so as to prevent driving wheels from slipping in order to thereby secure acceleration, steering stability and vehicle behavior stability when the automotive vehicle starts from stand still conditions.

In a case where the traction control device like this is equipped on a four-wheel drive vehicle, there may occur unfavorable conditions to the vehicle in which a vehicle behavior control device interferes with controls by a power distribution control device equipped on the four-wheel drive vehicle. For eliminating these problems, Japanese Patent Unexamined Publication No. Sho. 61-37541 discloses the four-wheel drive vehicle in which a four-wheel drive is forcibly shifted to a two-wheel drive when a slip control operation is activated.

On the other hand, Japanese Patent Unexamined Publication No. Hei. 1-266049 discloses a technology in which a limited slip differential function is stopped to provide for a so-called locked-up four-wheel drive when there occurs an acceleration slip. Namely, the acceleration slip suppression effect results from stopping the limited slip differential function.

However, with the former prior art, the four-wheel drive is shifted to the two-wheel drive at the same time as the slip control operation is activated. This may lead to a possibility that the drivability of the vehicle is remarkably deteriorated. In addition, there is caused a problem that the driver is forced to feel large physical disorders when there occurs a drastic change in vehicle characteristics that would result when the four-wheel drive is shifted to the two-wheel drive.

In addition, with the latter prior art, slips on the four wheels are rather promoted, leading to a risk that a sufficient traction performance cannot be secured.

SUMMARY OF THE INVENTION

The present invention was made in view of these situations. An object of the present invention is to provide an apparatus and a method for controlling a four-wheel drive vehicle which can continue to implement optimal limited slip differential controls without unnecessarily interfering with the traction control to maintain a superior drivability without making the driver feel the physical disorder, and to ensure that the stability of the vehicle can be improved by properly controlling slips on the four wheels.

With a view to attaining the object, according to a first aspect of the invention, there is provide a control apparatus for a four-wheel drive vehicle comprising:

a traction control unit for controlling a driving force when there occurs a wheel slip on a wheel;

a transfer device with a limited slip differential unit for limiting a differential rotational action between front and rear wheels for distributing said driving force transmitted thereto between the front and rear wheel sides; and a limited slip differential control unit for setting a limited slip differential force by the limited slip differential unit, wherein the limited slip differential control unit compensates for the limited slip differential force by said limited slip differential control unit in such a manner that the limited slip differential force is increased when there occurs a wheel slip exceeding a predetermined value at least either one of front left and right wheels or rear left and right wheels.

According to a second aspect of the invention, there is provided the control apparatus for the four-wheel drive vehicle as set forth in the first aspect of the invention, wherein the limited slip differential control unit sets the limited slip differential force according to at least either one of the driving force inputted into the transfer device or the difference in the number of rotations between the front and rear wheels.

According to a third aspect of the invention, there is provided the control apparatus for the four-wheel drive vehicle as set forth in the first or second aspect of the invention, wherein the limited slip differential control unit implements the increasing compensation of the limited slip differential force at the time of running at a low speed.

According to a fourth aspect of the invention, there is provided the control apparatus for the four-wheel drive vehicle as set forth in any of the first to third aspects of the invention, wherein the limited slip differential control unit implements the increasing compensation of the limited slip differential force according to at least a steering angle.

According to a fifth aspect of the invention, there is provided the control apparatus for the four-wheel drive vehicle as set forth in any of the first to fourth aspects of the invention, wherein the limited slip differential control unit implements the increasing compensation of the limited slip differential force according to at least a vehicle speed.

According to a sixth aspect of the invention, there is provided the control apparatus for the four-wheel drive vehicle as set forth in the fifth aspect of the invention, wherein the increasing compensation according to the vehicle speed is implemented when the steering angle is small.

According to a seventh aspect of the invention, there is provided the control apparatus for the four-wheel drive vehicle as set forth in any of the first to sixth aspects of the invention, wherein the traction control unit operates so that the driving force transmitted to a road surface is limited only when there occurs a wheel slip exceeding the predetermined value at least either one of the front left and right wheels or the rear left and right wheels.

Namely, with the control apparatus for the four-wheel drive vehicle according to the first aspect of the invention, the limited slip differential unit limits the differential rotation between the front and rear wheels with the limited slip differential force set by the limited slip differential control unit, and the transfer device distributes the driving force from the power source between the front and rear wheel for driving the vehicle. In addition, the traction control unit controls the driving force when there occurs a wheel slip on the wheel. Here, the limited slip differential control unit compensates for the limited slip differential force that is to be set by the limited slip differential control unit such that the limited slip differential force is increased when there occurs the wheel slip exceeding the predetermined value at least either one of the front left and right wheels or the rear left and right wheels. Consequently, in case there occurs the wheel slip exceeding the predetermined value at least either one of the front left and right wheels or the rear left and right wheels (for example, the wheel slip that occurs due to the difference in friction coefficient between the left and right wheels of the vehicle and the road surface, respectively, in normal driving conditions), the traction control unit is activated to control to suppress the driving force transmitted to the road surface, and the limited slip differential control unit is activated to increase the limited slip differential force for limiting the differential action between the front and rear wheels. Therefore, stable driving can be provided. Thus, the limited slip differential control unit operates properly when there occurs the wheel slip either one of on the left or right wheels and continues to implement the optimal limited slip differential control without necessarily interfering with the traction control. Therefore, it is possible to maintain the superior drivability without making the driver feel the physical disorder. In addition, the limited slip differential control unit can properly suppress wheel slips on the four wheels together with the traction control unit to thereby ensure the improvement in vehicle stability.

According to the second aspect of the invention, there is provided the control apparatus for a four-wheel drive vehicle as set forth in the first aspect of the invention, wherein the limited slip differential control unit sets the limited slip differential force according to at least either one of the driving force inputted into the transfer device or the difference in the number of rotations between the front and rear wheels. Therefore, the limited slip differential force is properly set in accordance with the driving conditions of the vehicle, thereby making it possible to ensure that the driving stability of the vehicle is improved.

According to the third aspect of the invention, there is provided the control apparatus for a four-wheel drive vehicle as set forth in the first or second aspect of the invention, wherein the limited slip differential control unit implements the increasing compensation of the limited slip differential force to be set by the limited slip differential control unit at the time of running at low speeds which is predetermined. Namely, in a case where the vehicle speed is fast, since the input torque is small and there occurs a little slip, no compensation is implemented for driving in those conditions to thereby improve the accuracy.

According to the fourth aspect of the invention, there is provided the control apparatus for the four-wheel drive vehicle as set forth in any of the first to third aspects of the invention, wherein the limited slip differential control unit implements the increasing compensation of the limited slip differential force to be set by the limited slip differential control unit according to at least a steering angle. Namely, in a case where the driver steers largely, if the increased compensation of the limited slip differential force is implemented, the vehicle characteristics are drastically shifted to the locked up condition of the four-wheel drive. This leads to a possibility that the driver feels a physical disorder. To cope with this, for example, it is designed such that the larger the steering angle becomes, the less the increasing compensation of the limited slip differential force is implemented. Therefore, the physical disorder can be reduced.

According to the fifth aspect of the invention, there is provided the control apparatus for a four-wheel drive vehicle as set forth in any of the first to fourth aspects of the invention, wherein the limited slip differential control unit implements the increasing compensation of the limited slip differential force to be set by the limited slip differential control unit according to at least the vehicle speed. Namely, since the faster the vehicle speed becomes, the smaller the input torque becomes and hence there occurs less wheel slip. For example, it is designed such that the faster the vehicle speed becomes, the less the increasing compensation of the limited slip differential force is implemented. Therefore, the control accuracy is improved.

According to the sixth aspect of the invention, there is provided the control apparatus for the four-wheel drive vehicle as set forth in the fifth aspect of the present invention, wherein the increasing compensation implemented by the limited slip differential control unit corresponding to the vehicle speed is implemented when the steering angle is small. In a case where the increasing compensation is implemented corresponding to the vehicle speed, in consideration of the effect of the steering angle (the occurrence of the physical disorder felt by the driver when he or she steers the steering wheel), as described above, the increasing compensation is implemented in such conditions that the steering angle is small and that the vehicle characteristics are little affected even if the vehicle characteristics are shifted to the permanent four-wheel drive.

According to the seventh aspect of the invention, there is provided the control apparatus for the four-wheel drive vehicle as set forth in any of the first to sixth aspects of the invention, wherein the traction control unit operates so that driving force transmitted to the road surface is limited only when there occurs the wheel slip exceeding the predetermined value at least either one of the front left and right wheels or the rear left and right wheels. Therefore, it is ensured that unnecessary torque is suppressed relative to the wheel slip occurring either on the left or right wheels, the vehicle stability being thereby improved.

DETAILED DESCRIPTION OF THE INVENTION

Referring to the appended drawings, a mode for carrying out the invention will be described below.

Figure 1:
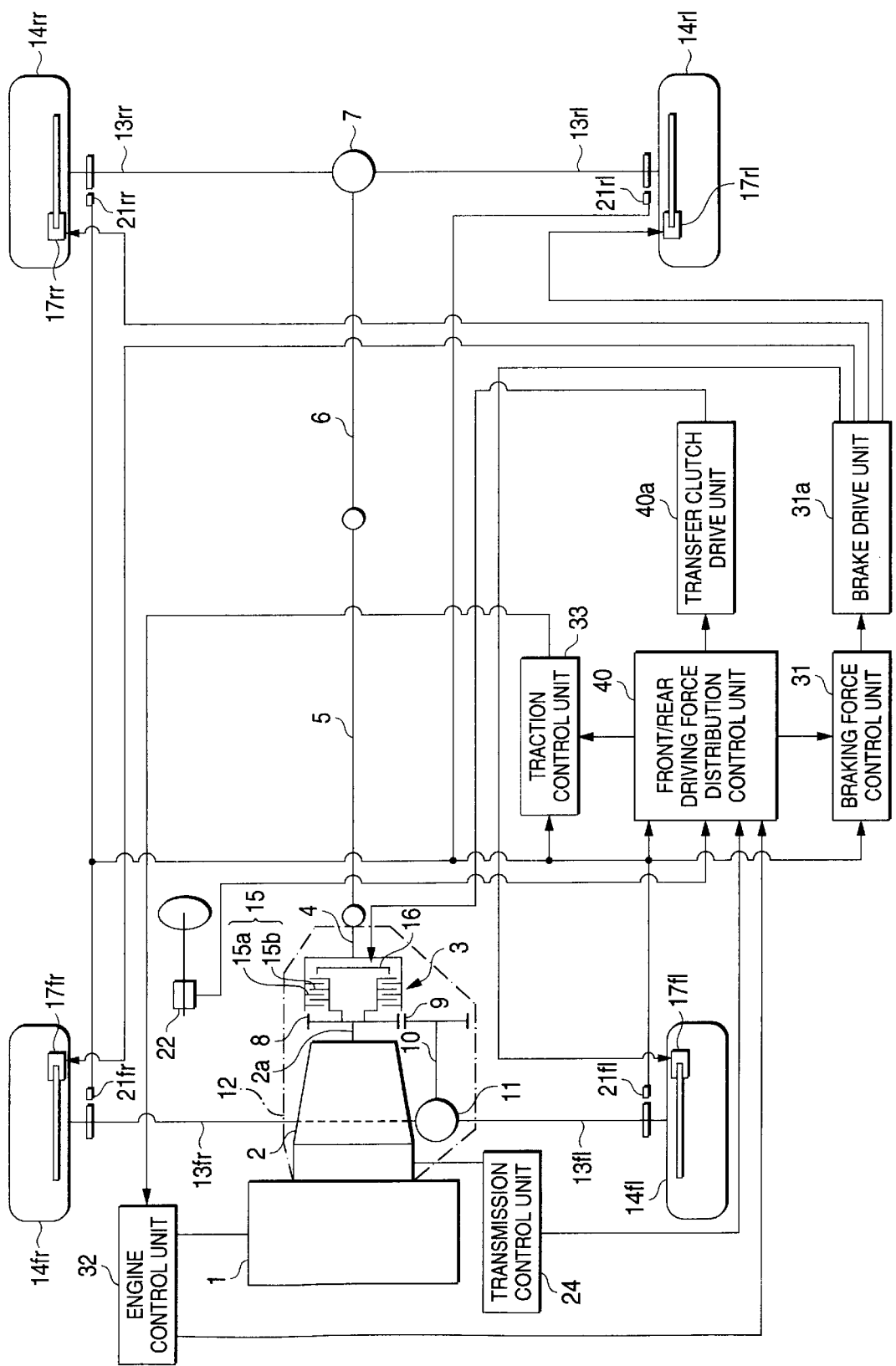
FIG. 1 is an explanatory view schematically showing an overall structure of a vehicle.
Figure 2:
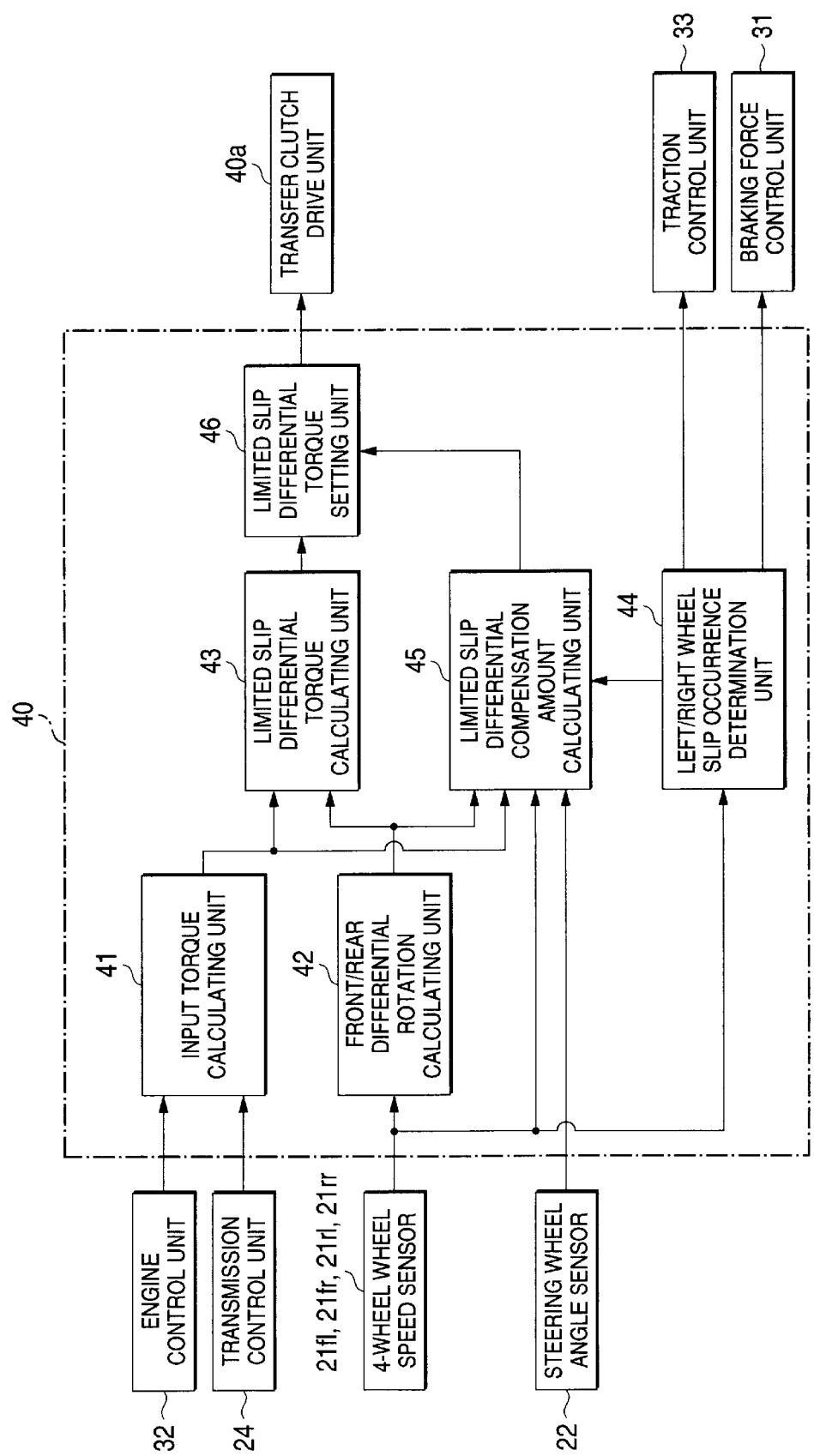
FIG. 2 is a block diagram showing functions of a front/rear driving force distribution control unit.
Figure 3:
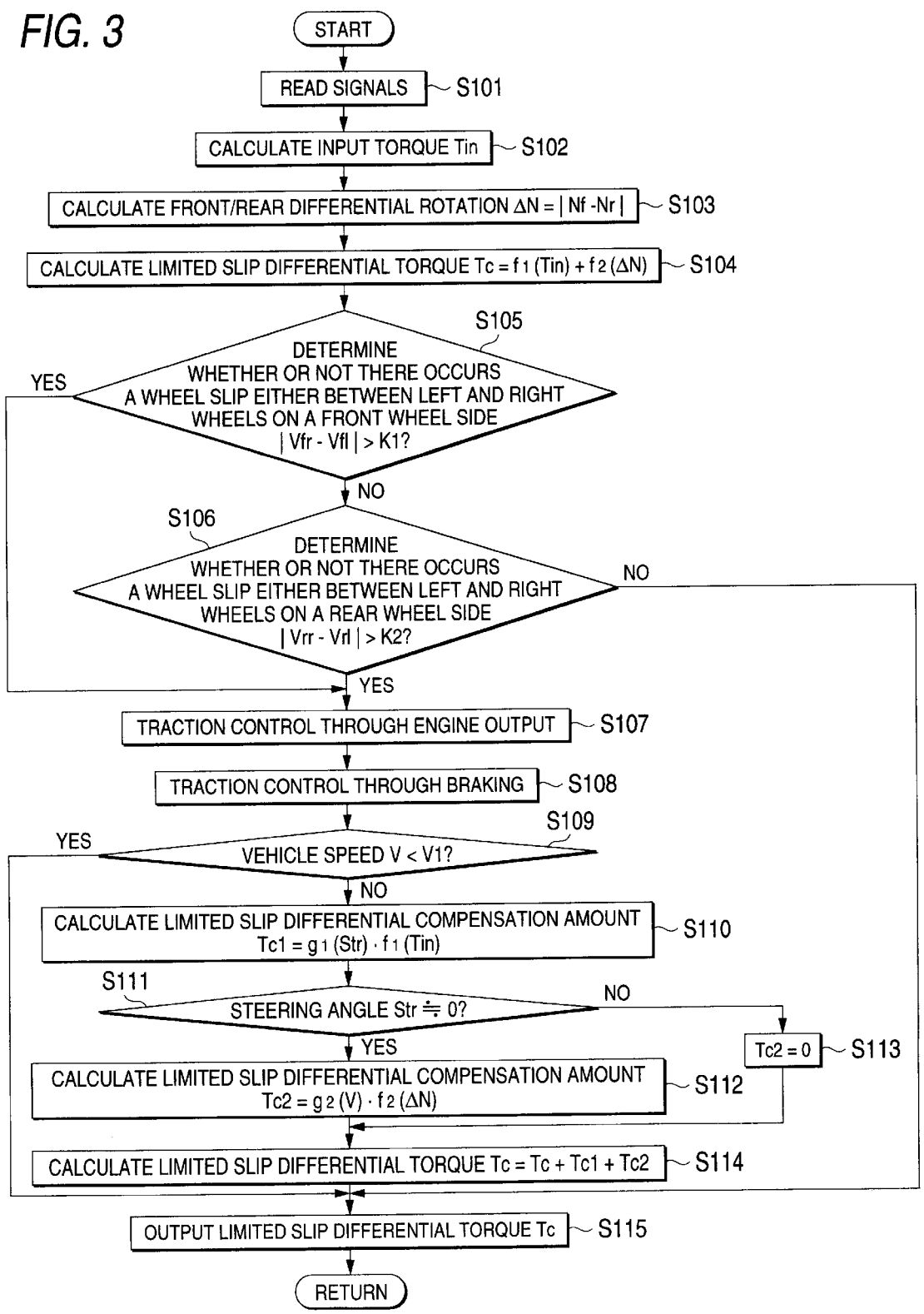
FIG. 3 is a flowchart describing front/rear driving force distribution controls.

FIGS. 1 to 3 show an embodiment of the invention. FIG. 1 is an explanatory diagram schematically showing the overall structure of a vehicle. FIG. 2 is a block diagram showing a function of a control unit for distributing driving forces between front and rear wheels of the vehicle. FIG. 3 is a flowchart showing the control of distributing the driving force between the front and rear wheels of the vehicle.

In FIG. 1, reference numeral 1 denotes an engine disposed at the front of a vehicle. Driving forces of these engine 1 is transmitted from an automatic transmission 2 (shown as incorporating a torque converter) disposed to the rear of the engine 1 and a transfer device 3 via a transmission output shaft 1a.

Furthermore, the driving force transmitted to the transfer device 3 is inputted into a rear final reduction gear 7 via a rear drive shaft 4, a propeller shaft 5 and a drive pinion shaft portion 6. The driving force is also inputted into a front final reduction gear 11 via a reduction drive gear 8, a reduction driven gear 9 and a front drive shaft 10 which operates as a drive pinion shaft. Here, the automatic transmission 2, the transfer device 3 and the front final reduction gear 11 are provided integrally in a case 12.

The driving force inputted into the rear final reduction gear 7 is transmitted to a left rear wheel 14rl and a right rear wheel 14rr via a left rear drive shaft 13rl and a right rear drive shaft 13rr, respectively. Moreover, the driving force inputted into the front final reduction gear 11 is transmitted to a left front wheel 14fl and a right front wheels 14fr via a left front drive shaft 13fl and a right front drive shaft 13fr, respectively.

The transfer device 3 includes a wet type multiple-disc clutch (a transfer clutch) 15 and a transfer piston 16. The multiple-disc clutch 15 is constituted in turn by alternating sets of drive plates 15a provided on a reduction drive gear 8 and driven plates 15b provided on a rear drive shaft 4. The transfer piston 16 is used as a limited slip differential unit for limiting the differential rotational action between the front and rear wheels by variably providing clamping forces (transfer clutch torque as limited slip differential force) of the transfer clutch 15. Thus, according to the present invention, there is provided the four-wheel drive vehicle based on a front-engine and front-drive vehicle (an FF vehicle) in which the torque distribution ratio between the front and rear wheels can be varied between the ratio from, for example, 100:0 to 50:50. In the four-wheel drive vehicle, with the control of the transfer clutch torque of the transfer clutch 15 by controlling the pressing force of the transfer piston 16, the driving force distribution between the front and rear wheels is varied and thus the limited slip differential force between the front and rear wheels is controlled.

The pressing force of the transfer piston 16 is provided by a transfer clutch drive unit 40a which is constituted by a hydraulic circuit having a plurality of solenoid valves incorporated therein. A control signal (an output signal to the solenoid valves which corresponds to the transfer clutch torque) for driving the transfer clutch drive unit 40a is outputted from a control unit 40 for controlling the distribution of the driving force between the front and rear wheels of the vehicle.

On the other hand, reference numeral 31a denotes a brake drive unit of the vehicle, and a master cylinder (not shown) is connected to the brake drive unit 31a which master cylinder is connected to a brake pedal which is adapted to be operated by the driver. Then, when the driver operates the brake pedal, a brake pressure is introduced by the master cylinder into respective wheel cylinders (left front wheel cylinder 17fl, right front wheel cylinder 17fr, left rear wheel cylinder 17rl, right rear wheel cylinder 17rr) of the four wheels 14fl, 14fr, 14rl, 14rr via the brake drive unit 31a. Thus, the brakes on the four wheels are applied to stop the vehicle.

The brake drive unit 31a is a hydraulic unit comprising a pressurizing source, a pressure reducing valve, and a pressure boosting valve. The brake drive unit 31a is provided for freely and individually introducing a brake pressure into the respective wheel cylinders 17fl, 17fr, 17rl, 17rr according to input signals from a braking force control unit 31, which will be described later, in addition to the operation of the brake pedal by the driver as described above.

In addition, output signals from a traction control unit 33, which will be described later, are inputted into an engine control unit 32 for implementing various engine controls such as fuel injection control.

The braking force control unit 31 and the traction control unit 33 are provided, respectively, as a traction control unit for freely controlling the driving force transmitted to the road surface when there occurs a wheel slip. The front/rear driving force distribution control unit 40 is provided to additionally function as a limited slip differential control unit.

Then, provided on the vehicle are sensors for detecting parameters required for controls at the respective control units 31, 33, 40. Namely, the wheel speeds Vfl, Vfr, Vrl, Vrr of the respective wheels 14fl, 14fr, 14rl, 14rr are detected by wheel speed sensors 21fl, 21fr, 21rl, 21rr for input into the respective control units 31, 33, 40. In addition, a steering wheel angle θH is detected by a steering wheel angle sensor 22 for inputting thereof into the front/rear driving force distribution control unit 40. Furthermore, an engine speed Ne and an engine output torque Te are inputted into the front/rear driving force distribution control unit 40 from the engine control unit 32. Additionally, a turbine speed Nt and the gear ratio i are inputted into the front/rear driving force distribution control unit 40 from a transmission control unit 24 for executing the control of gearshift of the automatic transmission 2.

The braking force control unit 31 detects a slippage of the respective wheels based on the respective wheel speeds Vfl, Vfr, Vrl, Vrr from the wheel speed sensors 21fl, 21fr, 21rl, 21rr. In case the slippage so detected reaches or exceeds a slippage determination value which is predetermined, the braking force control unit 31 outputs a predetermined control signal to the brake drive unit 31a for automatically braking to prevent a wheel spin. A signal for permitting the traction control through braking is inputted into the braking force control unit 31 from the front/rear driving force distribution control unit 40 only in case there occurs a wheel slip exceeding a predetermined value (K1 for the front wheel side, and K2 for the rear wheel) at least either one of the front left and right wheels or the rear left and right wheels.

Additionally, the traction control unit 33 detects the slippage of the respective wheels based on the respective wheel speeds Vfl, Vfr, Vrl, Vrr from the wheel speed sensors 21fl, 21fr, 21rl, 21rr. In case the slippage so detected reaches or exceeds a slippage determination value which is predetermined, the traction control unit 33 outputs a predetermined signal to the engine control unit 32 for reducing the torque from the engine 1. Note, as with the braking force control unit 31, that a signal for permitting the traction control through engine output is inputted into the traction control unit 33 from the front/rear driving force distribution control unit 40 only in case there occurs a wheel slip exceeding the predetermined value (K1 for the front wheel side, and K2 for the rear wheel side) at least either one of the front left and right wheels or the rear left and right wheels.

Inputted into the front/rear driving force distribution control unit 40 are the respective wheel speeds Vfl, Vfr, Vrl, Vrr from the wheel speed sensors 21fl, 21fr, 21rl, 21rr, the steering wheel angle θH from the steering wheel angle sensor 22, the engine speed Ne and the engine output torque Te from the engine control unit 32 and the turbine speed Nt and the gear ratio i from the transmission control unit 24.

Then, the front/rear driving force distribution control unit 40 calculates and sets a transfer clutch torque for the transfer clutch drive unit 40a based on the respective input signals. Further, the front/rear driving force distribution control unit 40 outputs the signals for permitting the execution of controls to the braking force control 31 and the traction control unit 33 only in case there occurs a wheel slip exceeding the set value (K1 for the front wheel side, and K2 for the rear wheel side) at least either one of the front left and right wheels or the rear left and right wheels.

Namely, as shown in FIG. 2, the front/rear driving force distribution control unit 40 mainly comprises an input torque calculating unit 41, a front/rear differential rotation calculating unit 42, a limited slip differential torque calculating unit 43, a left/right wheel slip occurrence determination unit 44, a limited slip differential compensation amount calculating unit 45 and a limited slip differential torque setting unit 46.

Inputted are the engine speed Ne, the engine output torque Te, the turbine speed Nt and the gear ratio i into the input torque calculating unit 41. An input torque Tin which is the transmission output torque is calculated by the following equation (1), and the input torque Tin so calculated is then outputted to the limited slip differential torque calculating unit 43 and the limited slip differential compensation amount calculating unit 45.

$$Tin = Te \cdot t \cdot i \quad (1)$$

Where, t is the torque ratio of the torque converter, and is obtained by referring to maps of the rotating speed ratio e (=Nt/Ne) of the torque converter and the torque ratio t of the torque converter, which is predetermined.

The respective wheel speeds Vfl, Vfr, Vrl, Vrr are inputted into the front/rear differential rotation calculating unit 42. The front/rear differential rotation calculating unit 42 calculates an average wheel speed Nf of the left and right front wheels (=(Vfl+Vfr)/2) and an average wheel speed Nr of the left and right rear wheels (=(Vrl+Vrr)/2), and then calculates a front/rear differential rotation ΔN (=|Nf−Nr|) from the average wheel speeds Nf, Nr. The front/rear differential rotation ΔN so calculated is then outputted to the limited slip differential torque calculating unit 43 and the limited slip differential compensation amount calculating unit 45.

Inputted into the limited slip differential torque calculating unit 43 are the input torque Ti from the input torque calculating unit 41 and the front/rear differential rotation ΔN from the front/rear differential rotation calculating unit 42. The limited slip differential torque calculating unit 43 first calculates a limited slip differential torque Tc, which becomes the reference, based on the input torque Tin and the front/rear differential rotation ΔN using the following expression (2) for output to the limited slip differential torque setting unit 46.

$$Tc = f1(Tin) + f2(\Delta N) \quad (2)$$

Where the function f1 is a function for multiplying the input torque Tin by a predetermined rear wheel driving force distribution ratio Ai and increasing the limited slip differential torque Tc in keeping with the increase in input torque Tin. In addition, the function f2 is a function for increasing the limited slip differential torque Tc as the front/rear differential rotation ΔN increases.

The limited slip differential torque Tc is set according to the input torque Tin and the front/rear differential rotation ΔN in this embodiment. However, in addition to that, the limited slip differential torque Tc may be set in consideration of the occurring yaw rate and the road surface conditions (the friction coefficient μ of the road surface).

The respective wheel speeds Vfl, Vfr, Vrl, Vrr are inputted into the left/right wheel slip occurrence determination unit 44. The left/right wheel slip occurrence determination unit 44 determines whether or not the differential rotation between the left and right front wheels (=|Vfl−Vfr|) is larger than a value (K1) which has been predetermined through experiments. In case the differential rotation is larger than the value K1, then the unit 44 determines that there is occurring a wheel slip on the front wheel side. Similarly, the left/right wheel slip occurrence determination unit 44 determines whether or not the differential rotation between the left and right rear wheels (=(|Vrl−Vrr|) is larger than a value (K2) which has been predetermined through experiments. In case the differential rotation is larger than the value K2, the unit 44 determines that there is occurring a wheel slip on the rear wheel side. Then, in a case where the left/right wheel slip occurrence determination unit 44 determines that there is occurring a wheel slip either on the front wheel side or the rear wheel side, the unit 44 outputs a permission signal to the braking force control unit 31 for permitting the traction control through braking and a permission signal to the traction control unit 33 for permitting the traction control through engine output. Furthermore, the results of the left/right wheel slip occurrence determination by the left/right wheel slip occurrence determination unit 44 are outputted to the limited slip differential compensation amount calculating unit 45.

Inputted into the limited slip differential compensation amount calculating unit 45 are the respective wheel speeds Vfl, Vfr, Vrl, Vrr, the steering wheel angle θH, the input torque Tin, the front/rear differential rotation ΔN and the results of the left/right wheel slip occurrence determination. Then, in case it is determined that there is occurring the wheel slip either on the front wheel side or the rear wheel side, with the vehicle speed V (for example, the average of the wheel speeds Vfl, Vfr, Vrl, Vrr of the four wheels) being lower than a set vehicle speed V1 which can be determined as a low speed which has been predetermined, or the input torque Tin becoming larger, a limited slip differential compensation amount Tc1 according to the steering angle and a limited slip differential compensation amount Tc2 according to the vehicle speed are calculated for outputting to the limited slip differential torque setting unit 46.

Here, the limited slip differential compensation amount Tc1 according to the steering angle is an increasing compensation amount for the term F1 (Tin) of the input torque Tin of the limited slip differential torque Tc. The limited slip differential compensation amount Tc1 is calculated from Tc1=g1 (Str) f1 (Tin), assuming that Str is the steering angle that is obtained from the steering wheel angle θH. The function g1 is made such that the value becomes smaller as the steering angle Str increases so that the limited slip differential compensation amount Tc1 becomes smaller. This is intended to reduce the physical disorder felt by the driver by making smaller the increasing compensation of the limited slip differential force as the steering angle Str increases because in case the increasing compensation of the limited slip differential force is implemented when the driver turns the steering wheel largely, the vehicle characteristics are drastically shifted to the four-wheel drive to there by make the driver feel a physical disorder.

In addition, the limited slip differential compensation amount Tc2 according to the vehicle speed is an increasing compensation amount for the term f2 (ΔN) of the front/rear differential rotation ΔN of the limited slip differential torque Tc. In this embodiment, the limited slip differential compensation Tc2 is calculated to be reflected as a compensating amount, in particular, only when the vehicle is driven straight with the steering angle Str being substantially "0" from the viewpoint of the steering angle Str. Consequently, the limited slip differential compensation amount Tc2 according to the vehicle speed when the vehicle is driven straight with the steering angle Str being substantially "0" is calculated from Tc2=g2(V)·f2(ΔN). The limited slip differential compensation amount Tc2 according to the vehicle speed when the vehicle is not driven straight with the steering angle Str being not substantially "0" is calculated from Tc2=0. Here, the function g2 is made such that the vehicle speed becomes smaller as the vehicle speed V becomes faster so that the limited slip differential compensation amount Tc2 to be calculated becomes smaller. This is because the faster the vehicle speed becomes, the smaller the input torque for the transfer clutch 15 becomes and hence there occurs less wheel slip.

Inputted into the limited slip differential torque setting unit 46 are the limited slip differential torque Tc from the limited slip differential torque calculating unit 43 and the limited slip differential compensation amounts Tc1, Tc2 from the limited slip differential compensation amount calculating unit 45 in the above driving conditions (that is, in a state in which there occurs the wheel slip either on the front wheel side or the rear wheel side and the vehicle is driven at low speeds) The limited slip differential torque setting unit 46 calculates the limited slip differential torque Tc for outputting to the transfer clutch drive unit 40a as a transfer clutch torque based on Tc, Tc1 and Tc2. Namely, the limited slip differential torque Tc calculated in the state in which there occurs a wheel slip either on the front wheel side or the rear wheel side and the vehicle is driven at low speeds becomes Tc=Tc+Tc1+Tc2 because the limited slip differential torque Tc from the limited slip differential torque calculating unit 43 is increasingly compensated for by the limited slip differential compensation amounts Tc1, Tc2.

Next, the front/rear driving force distribution control by the front/rear driving force distribution control unit 40 will be described with reference to a flowchart shown in FIG. 3. This program is repeatedly executed at predetermined time intervals. First, required signals are read in a step (hereinafter, simply referred to as "S") 101.

Next, the flow proceeds to S102, and the inputted torque Tin is calculated using the equation (1) at the input torque calculating unit 41. Then in S103, the front/rear differential rotation ΔN is calculated at the front/rear differential rotation calculating unit 42. In S104, the limited slip differential torque Tc is calculated by using the equation (2) at the limited slip differential torque calculating unit 43.

Thereafter, the flow proceeds to S105, and whether or not the difference in the number of the rotations between the left and right front wheels (=|Vfl−Vfr|) is larger than the value (K1) that has been predetermined through experiments is determined at the left/right wheel slip occurrence determination unit 44. In case the differential rotation is larger than the value K1, it is determined that there is occurring the wheel slip on the front wheel side, and the flow skips to S107. In S105, in case it is determined in S105 that the difference in the number of rotations between the left and right front wheels is equal to or smaller than the value K1, in other words, in case it can be determined that there is occurring a wheel slip on neither of the left and right front wheels, the flow proceeds to S106, where whether or not there is occurring a wheel slip on the rear wheel side is determined.

In S106, whether or not the difference in the number of rotations between the left and right rear wheels is larger than the value (K2) that has been predetermined through an experiment is determined at the left/right wheel slip occurrence determination unit 44. In case the difference in the number of rotations is larger than the value K2, it is determined that there is occurring the wheel slip on the rear wheel side, and the flow proceeds to S107. In contrast, in case it is determined in S106 that the difference in the number of rotations is equal to or smaller than the value K2, in other words, in case it can be determined that there is occurring the wheel slip on neither of the left and right rear wheels (as a result, in case it can be determined also from the result of the determination in S105 that there is occurring a wheel slip neither between the front left and right wheels nor the rear left and right wheels), then the flow skips to S115. In S115, the limited slip differential torque setting unit 46 sets the limited slip differential torque Tc calculated in S104 as a transfer clutch torque as it is for output.

On the other hand, when the flow proceeds to S107 after it is determined that there is occurring the wheel slip either between the front left and right wheels (S105) or between the rear left and right wheels (S106), the left/right wheel slip occurrence determination unit 44 outputs to the traction control unit 33 a permission signal for permitting the traction control through engine output. Then, a traction control for reducing the engine output in a predetermined manner is executed by the traction control unit 33.

The flow proceeds further to S108, where the left/right wheel slip occurrence determination unit 44 outputs to the braking force control unit 31 the permission signal for permitting the traction control through braking. Then, the traction control for preventing the wheel spin by imparting a predetermined magnitude of the braking force is executed by the braking force control unit 31.

Thereafter, the flow proceeds to S109, and whether or not the vehicle speed V (for example, the average of the vehicle speeds Vfl, Vfr, Vrl, Vrr of the four wheels) is lower than the set vehicle speed V1 is determined. In case it can be determined that the vehicle speed V is smaller than the set vehicle speed V1 and that the vehicle is being driven at low speeds, the flow proceeds to S110. In contrast, in case it is determined that the vehicle speed V is equal to or larger than the set vehicle speed V1, since the input torque to the transfer clutch 15 is small and there is occurring less wheel slip, the flow skips to s115. Then, in S115, the limited slip differential torque setting unit 46 sets the limited slip differential torque Tc calculated in S104 as the transfer clutch torque as it is for output.

When the flow proceeds to S110 after it is determined in S109 that the vehicle speed V is lower than the set vehicle speed V1 and that the vehicle is being driven at the low speeds, first the limited slip differential compensation amount Tc1 according to the steering angle (the increasing compensation amount for the term f1 (Tin) of the input torque Tin) is calculated from Tc1=g1 (Str) f1(Tin).

Next, the flow proceeds to S111, and whether or not the driver turns the steering wheel with the steering angle Str being substantially "0". In case the driver does not turn the steering wheel and the vehicle is being driven substantially straight, the flow proceeds to S112. In S112, the limited slip differential compensation amount Tc2 according to the vehicle speed V (the increasing compensation amount to the term f2 (ΔN) of the front/rear differential rotation ΔN) is calculated from Tc2=g2 (V)·f2 (ΔN) In contrast, in case the driver turns the steering wheel with the steering angle Str being not substantially "0", the flow proceeds to S113, where the driver is prevented from feeling the physical disorder resulting from the shift of the vehicle characteristics while he or she is turning the steering wheel by making Tc2=0.

Then, the flow proceeds to S114, where the final limited slip differential torque Tc is obtained by adding the limited slip differential compensation amount Tc1 according to the steering angle calculated in S112 to the limited slip differential torque Tc calculated in S104 and further adding thereto the limited slip differential compensation amount Tc2 according to the vehicle speed V calculated in S112 or the limited slip differential compensation amount Tc2(=0) set in S113. Then, the final limited slip differential torque Tc thus calculated is set for outputting as the transfer clutch torque in S115.

Thus, according to the embodiment of the present invention, the limited slip differential between the front and rear drive shafts continues to be implemented through transfer control in the front/rear driving force distribution control. The limited slip differential between the left and right wheels is implemented by the traction control through the engine output and the traction control through braking. Thus, the superior drivability can be maintained without making the driver feel the physical disorder, and it can be ensured that the vehicle stability is improved by properly suppressing wheel slips on the four wheels.

In case there occurs the wheel slip exceeding the predetermined value at least either between the front left and right wheels or between the rear left and right wheels, the limited slip differential force is compensated such that the limited slip differential force is increased. Therefore, more stable driving can be provided by improving the degree of the lock-up of the front and rear drive shafts against the wheel slip that would be generated by the difference in friction coefficient generated in the normal driving conditions between the left and right wheels of the vehicle and the road surface, respectively.

Furthermore, the control at the front/rear driving force distribution control unit 40, the traction control through the engine output at the traction control unit 33 and the traction control through braking at the braking force control unit 31 are implemented independently according to the different factors. Therefore, there is eliminated a control interference due to the differential rotation control, whereby the generation of uncomfortable vibrations and noises can be prevented.

In addition, according to the embodiment of the present invention, the four-wheel drive vehicle is described in which the driving force is distributed between the front and rear wheels by controlling the transfer clutch torque for the transfer clutch 15. However, it goes without saying that the present invention has general-purpose properties that it can be applied to a four-wheel drive vehicle whether or not it is equipped with a so-called center differential.

Additionally, according to the present invention, the examples are described in which the traction control through the engine output at the traction control unit 33 and the traction control through braking at the braking force control unit 31 can both be implemented. Therefore, the present invention can be applied to the vehicle in which only either of the two traction controls can be implemented or to the vehicle which has a known traction control that is different from those traction controls.

Furthermore, according to the embodiment of the invention, the limited slip differential compensation amount Tc1 according to the steering angle and the limited slip differential compensation amount Tc2 according to the vehicle speed V are used as the compensating amount for increasingly compensating for the limited slip differential torque Tc. Therefore, depending upon the specifications of the vehicle, either or both of the compensation amount values may be made constant.

Moreover, the method for increasingly compensating for the limited slip differential torque Tc is not limited to the adding method according to the embodiment of the present invention. For example, the increasing compensation can be implemented by setting a constant equal to or larger than 1 according to at least either the steering angle or the vehicle speed V and multiplying the set limited slip differential torque Tc by the constant so set.

Thus, as has been described heretofore, according to the present invention, the optimal limited slip differential control can continue to be carried out without interfering with the traction control more than required to thereby provide the superior drivability without making the driver feel the physical disorder resulting from the shift of vehicle properties. In addition, it can be ensured that the vehicle stability is improved by proper suppressing the wheel slips on the four wheels.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An apparatus for controlling a four-wheel drive vehicle comprising:
    a traction control unit for controlling a driving force when there occurs a wheel slip on a wheel;
    a transfer device with a limited slip differential unit for limiting a differential rotational action between front and rear wheels for distributing said driving force transmitted thereto between the front and rear wheel sides; and
    a limited slip differential control unit for setting a limited slip differential force by said limited slip differential unit,
    wherein said limited slip differential control unit compensates for said limited slip differential force by said limited slip differential control unit in such a manner that said limited slip differential force is increased when there occurs a wheel slip exceeding a predetermined value at least either one of front left and right wheels or rear left and right wheels.

2. The apparatus for controlling the four-wheel drive vehicle as set forth in claim 1, wherein said limited slip differential control unit sets said limited slip differential force according to at least either one of the driving force inputted into said transfer device or the difference in the number of rotations between the front and rear wheels.

3. The apparatus for controlling the four-wheel drive vehicle as set forth in claim 1, wherein said limited slip differential control unit implements the increasing compensation of said limited slip differential force at the time of running at a low speed.

4. The apparatus for controlling the four-wheel drive vehicle as set forth in claim 1, wherein said limited slip differential control unit implements the increasing compensation of said limited slip differential force according to at least a steering angle.

5. The apparatus for controlling the four-wheel drive vehicle as set forth in claim 1, wherein said limited slip differential control unit implements the increasing compensation of said limited slip differential force according to at least a vehicle speed.

6. The apparatus for controlling the four-wheel drive vehicle as set forth in claim 5, wherein said increasing compensation according to the vehicle speed is implemented when the steering angle is small.

7. The apparatus for controlling the four-wheel drive vehicle as set forth in claim 1, wherein said traction control unit operates so that driving force transmitted to a road surface is limited only when there occurs a wheel slip exceeding the predetermined value at least either one of the front left and right wheels or the rear left and right wheels.

8. The apparatus for controlling the four-wheel drive vehicle as set forth in claim 1, wherein the traction control units controls the driving force transmitted to a road through at least one of an engine output and a braking.

9. A method for controlling the four-wheel drive vehicle comprising:

controlling a driving force when there occurs a wheel slip on a wheel;

distributing a driving force transmitted from a power source to front and rear wheel sides while limiting a differential rotational action between said front and rear wheels with a limited slip differential force;

setting the limited slip differential force; and compensating for the limited slip differential force to be set by said setting step in such a manner that said limited slip differential force is increased when there occurs a wheel slip exceeding a predetermined value at least either between left and right wheels on the front wheel side or between left and right wheels on the rear wheel side.

10. The method for controlling the four-wheel drive vehicle as set forth in claim 9, wherein said limited slip differential force is set according to at least either one of the driving force that is to be inputted into said transfer device or the difference in the number of rotations between the front and rear wheels.

11. The method for controlling the four-wheel drive vehicle as set forth in claim 9, wherein the increasing compensation of said limited slip differential force is implemented at the time of running at low speeds which is predetermined.

12. The method for controlling the four-wheel drive vehicle as set forth in claim 9, wherein the increasing compensation of said limited slip differential force is implemented according to at least a steering angle.

13. The method for controlling the four-wheel drive vehicle as set forth in claim 9, wherein the increasing compensation of said limited slip differential force is implemented according to at least a vehicle speed.

14. The method for controlling the four-wheel drive vehicle as set forth in claim 13, wherein said increasing compensation according to the vehicle speed is implemented when the steering angle is small.

15. The method for controlling the four-wheel drive vehicle as set forth in claim 9, wherein the driving force that is to be transmitted to a road surface is limited only when there occurs a wheel slip exceeding the predetermined value at least either one of the front left and right wheels or the rear left and right wheels.

16. The method for controlling the four-wheel drive vehicle as set forth in claim 9, wherein the driving force transmitted to a road surface is controlled through an engine output or a braking operation.

* * * * *